April 28, 1970   R. L. HEACOCK ET AL   3,508,877
PROCESS FOR MEASURING THE LIVE CARBON CONTENT OF ORGANIC SAMPLES
Filed Nov. 13, 1967   3 Sheets-Sheet 1

INVENTORS:
ROBERT L. HEACOCK
ARCHIE HOOD
BY: Louis J Bovasso

THEIR ATTORNEY

April 28, 1970  R. L. HEACOCK ET AL  3,508,877
PROCESS FOR MEASURING THE LIVE CARBON CONTENT OF ORGANIC SAMPLES
Filed Nov. 13, 1967  3 Sheets-Sheet 3

INVENTORS:
ROBERT L. HEACOCK
ARCHIE HOOD
BY: Louis J. Bovasso
THEIR ATTORNEY

United States Patent Office 3,508,877
Patented Apr. 28, 1970

3,508,877
PROCESS FOR MEASURING THE LIVE CARBON
CONTENT OF ORGANIC SAMPLES
Robert L. Heacock, Littleton, Colo., and Archie Hood,
Houston, Tex., assignors to Shell Oil Company, New
York, N.Y., a corporation of Delaware
Filed Nov. 13, 1967, Ser. No. 682,466
Int. Cl. G01n 21/24, 31/12, 33/24
U.S. Cl. 23—230
8 Claims

ABSTRACT OF THE DISCLOSURE

A process for measuring the live carbon content of an organic sample by heating the sample to pyrolyzing temperature so that vapors are given off. The vapors are condensed, the fluorescence thereof is measured and the live carbon content of the sample material is determined by correlating the measured fluorescene with the fluorescence from a material of known carbon content.

BACKGROUND OF THE INVENTION

Field of the invention

This invention relates to a process for measuring the live carbon content of organic samples and, more particularly, the live carbon content of bit cuttings obtained in drilling a well in subterranean earth formations so as to map the distribution of live organic carbon content of the subterranean formations.

Description of the prior art

Various geochemical methods have been suggested previously for determining the location of underground petroleum reservoirs. These methods are intended to detect the presence of petroleum constituents in surface or underground formations in greater than normal quantity. Such anomalies are taken as an indication of the proximity of a petroleum reservoir or other concentration of petroleum-type hydro-carbons. It is thus possible, by detecting the presence of petroleum constituents in earth samples such as soil or rock samples, to ascertain the location and proximity of petroleum deposits by correlating the relative amounts of petroleum constituents present in the earth samples with the locations from which the samples were taken.

It has been suggested previously that the presence of petroleum constituents in an earth sample may be detected by extracting organic constituents from the earth sample and then evaluating the fluorescence of the extract or a concentration thereof under ultraviolet light. These methods depend upon the known fluorescence of certain petroleum constituents, especially intermediate aromatics. One such method is described in U.S. Patent No. 2,451,883. However, such prior art techniques are relatively elaborate and complex.

SUMMARY OF THE INVENTION

It is an object of this invention to rapidly and economically determine the live carbon content of an organic sample.

It is a further object of this invention to rapidly and economically map the distribution of live organic carbon concentration in samples, such as bit cuttings released in drilling a well, from subterranean earth formations.

The invention is carried out by heating an organic sample to a selected pyrolyzing temperature at which vapors are given off. These vapors are condensed and the fluorescence of a unit sample of the vapors is measured. The live carbon content of the sample material is then determined by correlating the measured fluorescence with the fluorescence from a material of known carbon content. In one application of the invention, a plurality of such samples, preferably comprising bit cuttings released by drilling a plurality of well boreholes, are measured so as to map the live carbon contents of the subterranean earth formations.

DESCRIPTION OF THE PREFERRED EMBODIMENT

Figure 1:
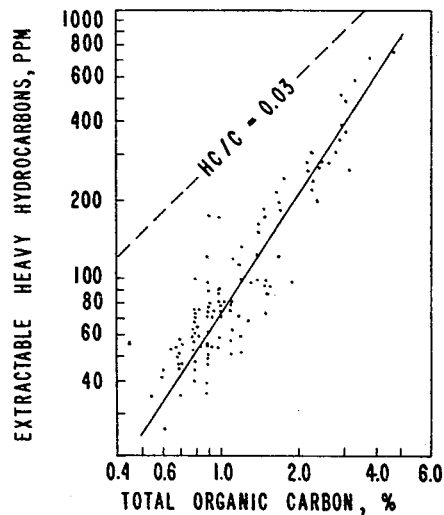
FIGURES 1 through 6 are graphical presentations comparing the results obtained by the process of the invention with known tests.

There are three types of carbon of organic matter. Total carbon includes all of the organic (i.e., noncarbonate) carbon in a sample. Live carbon is that portion of the total crabon which, on pyrolysis at 500° C. in the laboratory or during future burial to greater depths and temperatures in the subsurface, yields appreciable quantities of hydrocarbons and other volatile organic matter. Dead carbon is the remaining portion of total carbon, i.e., that which, on heating, yields essentially no hydrocarbons or other volatile organic matter.

In earth formations, mixture of both dead and live carbon commonly occur. It is mainly the live carbon of fine-grained rocks with which we are concerned in the instant disclosure, since it represents the source of the carbon of petroleum molecules. After exposure to laboratory temperatures of about 500° C. or to subsurface temperatures of about 250° to 300° C., the live carbon is destroyed thermally, and the remaining carbon is dead carbon.

The organic live carbon contents of subterranean earth formations are determined by sampling bit cuttings released by drilling at known depths and locations within the earth formations. A sample of the bit cuttings is preferably heated in a small container, such as a glass test tube, held over the flame of a heating device, such as a Bunsen burner, until the closed end of the test tube reaches a selected pyrolyzing temperature and vapors are given off. This temperature is approximately 500° C. or the point when the closed end of the test tube turns red (i.e., "red heat"). Such a temperatures insures the pyrolysis of substantially all of the organic matter within a relatively short treatment time.

The amount of bit cuttings placed in the test tube for sampling is relatively small, as, for example, about ten small drill cuttings or approximately one-tenth of a gram. The test tube is held generally horizontally while being heated, with the closed end over the heating device. The open end of the tube remains cool and thus the pyrolytic vapors from the cuttings tend to condense on the walls of the tube. When the sample is cool, a small quantity of solvent is added to obtain a nearly transparent solution. For example, three milliliters of chlorothene is added to the one-tenth gram sample, and the solution obtained is transferred to a clean test tube.

The test tube containing the solution is then placed in a conventional fluorometer (for example, a Turner Model 110 fluorometer, preferably modified by the addition of a 99% opaque neutral density filter to bring the sensitivity of the fluorometer within the range typically needed for 0.1 gram samples) for measuring the light intensity of the solution.

As discussed above, the solution must be nearly transparent in order to obtain an accurate reading. Those samples giving a fluorescence reading greater than about 20 on the modified Turner fluorometer, or having a brown-colored solution, may, on further dilution with solvent, give larger meter readings of fluorescence per unit of original sample (this is believed to be due to light absorption by the relatively concentrated solutions of pyrolysis products from organic rich rocks, while the anomalous light absorption decreases with dilution). Such samples, are repeatedly diluted 1:1 with solvent until a maximum fluorescence per unit of original sample is obtained. The final reading for the diluted sample is multiplied by the dilution factor to obtain the corrected fluorescence.

The approximate 500° C. pyrolyzing temperature is considerably greater than the temperature at which oil is formed from organic matter in sediments in the subsurface. The effects of such a high temperature on the organic matter of a fine-grained sediment may be postulated as follows: First, part of the organic matter is converted to a nonvolatile, carbonacious residue (i.e., dead carbon). Second, simultaneously, the other part of the organic matter is converted to volatile hydrocarbons and related compounds which are rapidly distilled from the rock. The higher-boiling products are condensed on the cool walls of the test tube. Third, the distribution of molecules by size and type in the volatile pyrolysis products may differ considerably from the total distribution of molecules which would be released from the rock under natural conditions of increasing depth of burial within the earth. However, although the proportion of volatile pyrolysis products exhibiting fluorescence is probably small, the fluorescence of the volatile pyrolysis products is related to the sum of (a) the small amount of heavy hydrocarbons in the rock before pyrolysis and (b) the additional oil which could be generated in the rock under natural conditions of increasing temperature. The following discussion of the figures of the drawing will bring out this relationship more clearly.

Samples used in developing and checking the method discussed above and the interpretations following were taken from central Wyoming core holes drilled in 1963. These samples are all Cretaceous rocks that have not been exposed to high temperatures and are immature geochemically, as determined from the predominance of odd-carbon-numbered normal paraffins, low naphthene ring index and low ratio of extractable hydrocarbons to total organic carbon. FIGURE 1 shows the relationship of extractable heavy hydrocarbons to total organic carbon contents in the Wyoming core holes. These results were obtained by routine source rock analysis. The dead carbon contents of the Wyoming core hole samples are in all cases close to 1% wt. Hence the relationship involving total organic carbon in FIGURES 1 through 3 can be converted approximately to a basis of live carbon simply by considering live carbon to be 1% wt. less than the total organic carbon.

Figure 2:
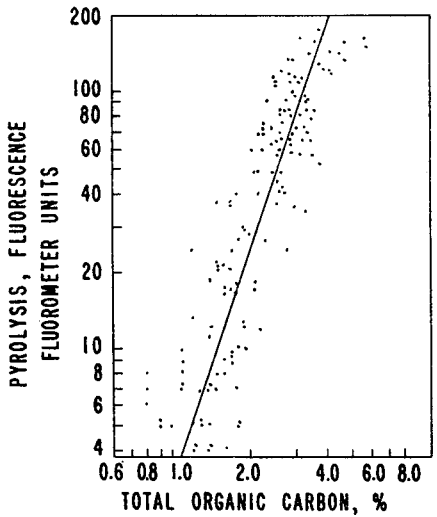
Figure 4:
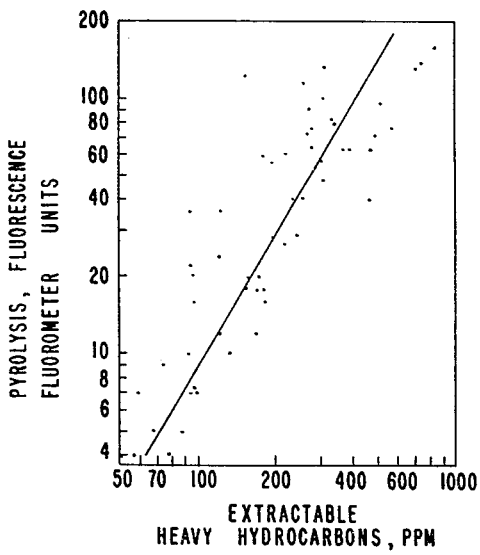
Figure 5:
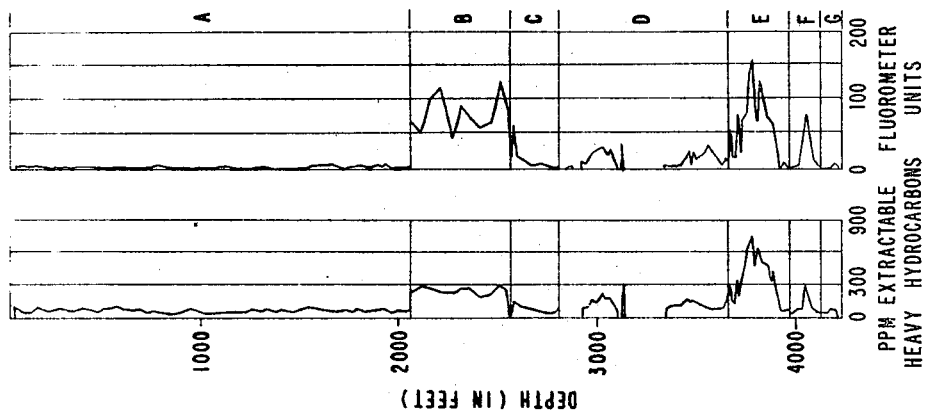
Figure 3:
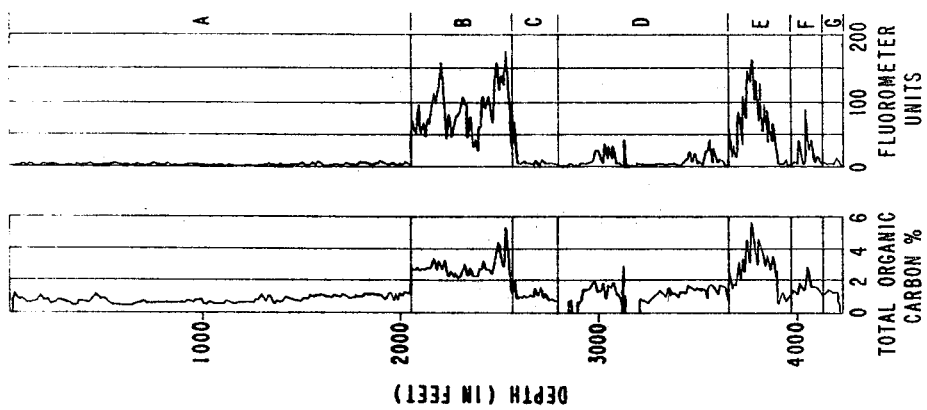

The correlation between total organic carbon conent and pyrolysis-fluorescence values is shown in FIGURES 2 and 3. FIGURE 2 shows the relationship of pyrolysis-fluorescence values to total organic carbon contents in the Wyoming core holes of FIGURE 1. FIGURE 3 is a stratigraphic comparison of the total organic carbon contents and pyrolysis fluorescence values in the Wyoming core holes. The right-hand portion of the graph includes data for samples analyzed by the test tube pyrolysis-fluorescence process of the invention; the left-hand portion of the graph includes data analyzed for total organic carbon. The types of formations traversed by the well borehole are indicated by the letters to the extreme right of the graph of FIGURE 3. These formations are as follows:

A—Steele shale
B—Niobrara limy shale
C—Carlile shale
D—Frontier formation
E—Mowry shale
F—L. Thermopolis shale
G—Cloverly formation FIGURE 4 shows a comparison of pyrolysis-fluorescence values to extractable heavy hydrocarbons in the Wyoming core holes. As in FIGURE 3, the right-hand portion of FIGURE 5 includes data for samples analyzed by the test tube pyrolysis-fluorescence process of the invention; the left-hand portion of the graph depicts the content of extractable heavy hydrocarbons. The types of formations traversed by the well borehole are indicated by the letters to the extreme right of the graph of FIGURE 5 and correspond to the letters descussed above with respect to FIGURE 3.

Figure 6:
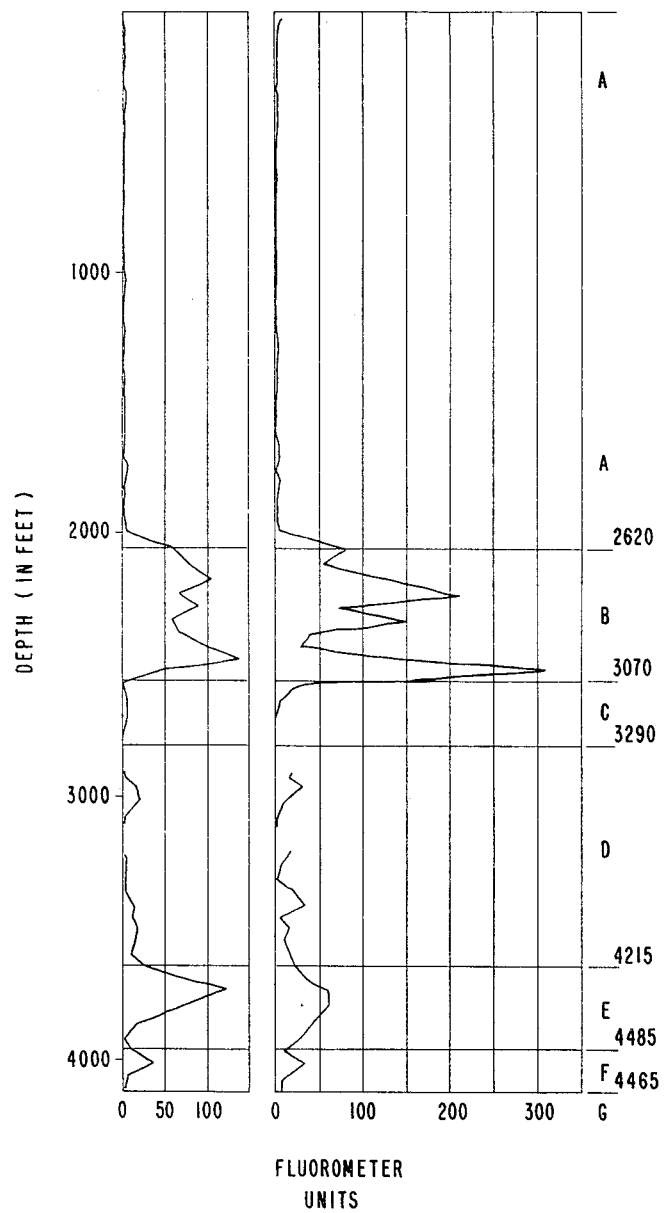

FIGURE 6 is a stratigraphic distribution of pyrolysis-fluorescence values comparing samples from the core hole of FIGURES 1 through 5 with drill cuttings from a nearby well (approximately 10 miles away). The right-hand portion of the graph corresponds to the drill cuttings; the left-hand portion of the core hole samples. The types of formations encountered are listed to the extreme right of FIGURE 6 and similar letters correspond to those listed above with respect to FIGURE 3. This graph shows that there is a good correlation between the core hole samples and the drill cuttings from the nearby well borehole. FIGURE 6 also shows that pyrolysis-fluorescence data for good cuttings can be used interchangeably with the rarely available data for cores in the evaluation of the hydrocarbon potential of a source formation.

In summary, the test tube pyrolysis fluorescence method of our invention gives good correlations with more elaborate chemical methods for determining concentrations of live organic carbon and extractable heavy hydrocarbons in a subterrean formation. It provides one way of conducting a sampling and mapping procedure that utilizes wells that may be drilled for purposes other than mapping procedure. The sampling and mapping procedure comprises: sampling the bit cuttings from correlatable depths in a plurality of wells; pyrolyzing samples of the cuttings at a common selected temperature; measuring a common selected property of each pyrolyzate that is indicative of the live organic carbon content of the bit cutting material; and indicating the variation with the areal location of the live organic carbon content of earth formations from which bit cuttings were obtained. The pyrolyzing and measuring procedures can be of any of a wide variety of procedures, such as electric furnace pyrolysis, flame ionization detector analysis, spectrometric analysis or the like, that provide adequate rapidity and economy with adequate accuracy.

The method of our invention has the advantages of excellent reproducibility of results, speed and simplicity of operation, small size requirement, and low analytical cost. One application of our invention would be a process of classifying bituminous shale when many samples must be examined and screened for the construction of "source rock" maps. Thus, our method is especially useful in identifying and evaluating the quality of both oil shales and petroleum source rocks. Comparable methods may yield somewhat more accurate results but generally require much larger samples and much longer analytical time. For example, the Fischer Assay method requires 60-gram samples and in excess of two hours analytical time. The pyrolysis-fluorescence analysis of our invention requires only 0.1 grams of sample and three to four minutes per analysis.

Although our invention has been described with relation to live organic carbon in subterranean earth formations, substantially any material having a pyrolyzable organic carbon content can be analyzed by our method, as, for example, resins, paints, etc.

In respect to mapping the distribution of subterranean live organic carbon contents, the data obtained from a plurality of wells in a given location can be used to indicate both the vertical and areal distribution of live carbon within the location.

Of course, other methods for heating a sample may occur to one skilled in the art. For example, larger containers and other types of heating devices may be used. However, our method gives excellent results with a relatively small sample size in a relatively short length of time. The test tubes can be quickly emptied and cleaned for further measurements, if desired.

We claim as our invention:

1. A process for measuring the carbon content of an organic sample comprising the steps of:
   heating said sample to a selected pyrolyzing temperature until pyrolytic vapors are given off by said sample;
   condensing the pyrolytic vapors;
   measuring the fluorescence that is exhibited by the condensed vapors of a unit of said sample; and
   determining the carbon content of said sample by correlating the measured fluorescence with fluorescent values of materials whose organic carbon content is known.

2. The process of claim 1 including, prior to heating said sample, the step of:
   disposing approximately one-tenth of a gram of said sample in the closed end of an open ended test tube.

3. The process of claim 2 wherein the step of heating said sample includes holding said test tube substantially horizontally over the flame of a heating device, the closed end of said test tube containing said sample being directly in contact with said flame.

4. The process of claim 3 including, after condensing the vapors, the steps of:
   cooling said sample;
   adding a solvent to said sample until said sample is substantially transparent; and
   transferring said cooled sample to a second test tube.

5. The process of claim 4 wherein the step of measuring the fluorescence includes the step of placing the second test tube containing the cooled sample in a light-intensity measuring device.

6. The process of mapping the distribution of organic carbon content of bit cuttings released in drilling a well in a subterranean formation comprising the steps of:
   removing a sample of said bit cuttings at a known depth and location within said subterranean formation;
   heating said sample to a selected pyrolyzing temperature until pyrolytic vapors are given off by said sample;
   condensing the pyrolytic vapors;
   measuring the fluorescence that is exhibited by the condensed vapors of a unit of said sample;
   determining the carbon content of said sample by correlating the measured fluorescence with fluorescent values of materials whose organic carbon content is known; and
   correlating the relationship between the known depth and location of said sample with the determined carbon content of said sample, thus determining both the depth at which live organic matter disappears and the depth at which source rocks for liquid hydrocarbons can be found in a given area.

7. The process of claim 6 including the steps of:
   determining the carbon content of a plurality of samples of bit cuttings removed at a plurality of known depths and locations within said subterranean formations; and
   recording the carbon content of said samples with relation to the depth and location of said samples so as to man the distribution of all of said samples within said subterranean formation.

8. A process for measuring the carbon content of a relatively small portion of an organic sample, including a first test tube having an open end and a closed end, a heating device having a flame to heat said portion, a second test tube having an open end and a closed end, and a light-intensity measuring device, said process including the steps of:
   disposing said portion in the closed end of said first test tube;
   holding said first test tube substantially horizontally with the closed end of said first test tube being directly in contact with the flame of said heating device;
   heating said portion to a selected pyrolyzing temperature until pyrolytic vapors are given off by said portion;
   condensing the pyrolytic vapors on the walls of said first test tube;
   cooling said portion within said first test tube;
   adding a solvent to said cooled portion until said portion is a substantially transparent solution;
   transferring said solution to the closed end of the second test tube;
   measuring the fluorescence that is exhibited by the condensed vapors of a unit of said portion by placing said second test tube in said light-intensity measuring device; and
   determining the carbon content of said sample by correlating the measured fluorescence with fluorescent values of materials whose organic carbon content is known.

References Cited

UNITED STATES PATENTS

| 2,183,964 | 12/1939 | Horvitz. |
| 2,451,883 | 10/1948 | Squires. |
| 3,322,504 | 5/1967 | Capuano. |

MORRIS O. WOLK, Primary Examiner

ROBERT M. REESE, Assistant Examiner

U.S. Cl. X.R.

23—232; 250—71